(12) United States Patent
Sowul et al.

(10) Patent No.: US 8,708,105 B2
(45) Date of Patent: Apr. 29, 2014

(54) TRANSMISSION WITH SPLASH LUBRICATION SYSTEM

(75) Inventors: Henryk Sowul, Oxford, MI (US); Kent A. Miller, Pinckney, MI (US); Robert J. Stefanick, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 334 days.

(21) Appl. No.: 12/844,076

(22) Filed: Jul. 27, 2010

(65) Prior Publication Data

US 2012/0024107 A1     Feb. 2, 2012

(51) Int. Cl.
*F16H 57/02*        (2012.01)
*F16C 3/02*         (2006.01)

(52) U.S. Cl.
USPC ........................................... 184/11.1

(58) Field of Classification Search
USPC .............. 184/11.1, 6.12, 11.2, 13.1; 475/159; 477/45; 123/196 R
See application file for complete search history.

(56) References Cited

U.S. PATENT DOCUMENTS

| | | | | |
|---|---|---|---|---|
| 2,333,161 | A * | 11/1943 | Dunn | 184/6.12 |
| 4,231,266 | A * | 11/1980 | Nishikawa et al. | 74/467 |
| 4,368,802 | A * | 1/1983 | Grabill et al. | 184/6.12 |
| 4,644,815 | A * | 2/1987 | Kawano et al. | 74/467 |
| 6,110,070 | A * | 8/2000 | Nagai et al. | 476/8 |
| 6,644,440 | B2 * | 11/2003 | Kageyama et al. | 184/11.2 |
| 7,261,183 | B2 * | 8/2007 | Miller | 184/6.12 |
| 7,513,172 | B2 * | 4/2009 | Takahashi et al. | 74/467 |
| 2001/0011616 | A1 * | 8/2001 | Kageyama et al. | 184/6.12 |
| 2003/0070877 | A1 * | 4/2003 | Min et al. | 184/6.12 |
| 2005/0205360 | A1 * | 9/2005 | Borcherding | 184/11.1 |

* cited by examiner

*Primary Examiner* — William E Dondero
*Assistant Examiner* — Mark K Buse
(74) *Attorney, Agent, or Firm* — Quinn Law Group, PLLC

(57) ABSTRACT

A transmission is provided with a transmission case partially defining a cavity containing unpressurized fluid. The transmission case has a first feature configured to collect splashed fluid and a second feature configured to direct the collected fluid to a chamber at least partially formed by the transmission case. A cap connected to the transmission case has an opening and an orifice offset from the opening. Fluid flows from the chamber through the orifice to a component when fluid reaches a first level in the chamber and flows through the central opening through an axial passage in the shaft to other components when fluid reaches a second level in the chamber. Fluid flow is provided to components through an axial passage from both ends of a rotatable shaft, such as an input shaft. The axial passage may have a threaded end to pump oil away from the end and prevent backflow.

15 Claims, 5 Drawing Sheets

TRANSMISSION WITH SPLASH LUBRICATION SYSTEM

TECHNICAL FIELD

The invention relates to a transmission with nonpressurized lubrication.

BACKGROUND

Transmissions include many rotating components that require lubrication for proper performance and longevity. "Splash" lubrication systems rely on the routing of splashed oil through the transmission to necessary components, without the aid of a pump or other mechanism to pressurize the fluid. In known splash-based lube systems, oil collected in chambers formed by the transmission case is generally routed to bearings near the ends of rotating shafts in the transmission. It is difficult to route some of the fluid to components further from the cavities and to control the amount of lubrication to the bearings. If the rotatable shafts have axial bores to route the fluid first axially and then radially outward through radial passages to other components, most of the fluid flows through the radial passages spaced closest to the end of the shaft near the chamber.

SUMMARY

An improved splash lubrication system for a transmission is presented that passively prioritizes lubrication of components. The system is "passive" because no pumps or controlled valves are used. Fluid flow through rotatable shafts to transmission components in need of lubrication is also improved. Specifically, a transmission is provided with a transmission case at least partially defining a cavity containing unpressurized fluid. The transmission case has a first feature configured to collect the fluid when the fluid is splashed. A second feature is configured to direct the collected fluid to a chamber at least partially formed by the transmission case. A cap is connected to the transmission case to further define the chamber. The cap may also be referred to as a feeder cap or a feeder plate, although it need not have a flat plate-like shape. The cap has a central opening and an orifice offset from the central opening. Fluid flows from the chamber through the orifice when fluid reaches a first level in the chamber and flows through the central opening when fluid reaches a second level in the chamber different than the first level. Thus, lubrication of transmission components is prioritized. For example, components in communication with the orifice may be lubricated prior to those in communication with the central opening, such as gears and synchronizers. The amount of fluid that reaches the component (e.g., a tapered roller bearing) lubricated via flow through the orifice can be easily calibrated by adjusting the size and position of the orifice. Furthermore, lubrication may be provided from both ends of the rotating shaft, so that lubrication of components through an axial passage and radial passages along the shaft is more evenly distributed.

The above features and advantages and other features and advantages of the present invention are readily apparent from the following detailed description of the best modes for carrying out the invention when taken in connection with the accompanying drawings.

DETAILED DESCRIPTION

Figure 1:
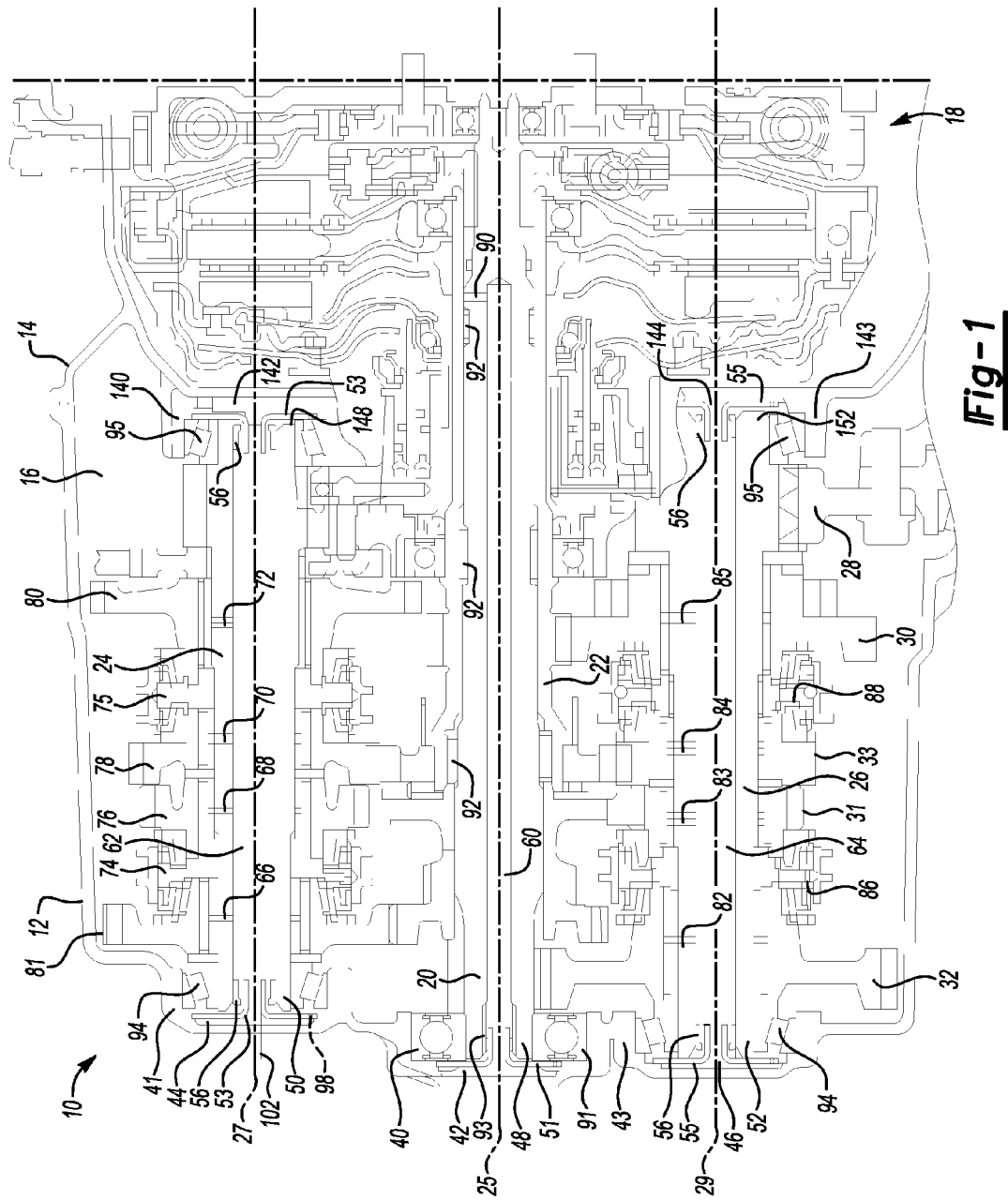
FIG. 1 is a schematic cross-sectional illustration of a transmission.

Referring to the drawings, wherein like reference numbers refer to like components throughout the several views, FIG. 1 shows a schematic cross-sectional view of a transmission 10, without cross-hatching for clarity in the drawing. The transmission 10 has a transmission case 12 and a clutch housing 14 (sometimes referred to as a bell housing) connected to the case 12. Together, the case 12 and the clutch housing 14 define a cavity 16 housing a plurality of rotatable shafts and other rotatable transmission components described further below. Lubricating fluid is contained in the cavity 16 for lubricating the rotatable transmission components by splashing of the fluid without any pressurization. That is, the transmission 10 does not include a pump to pressurize the lubricating fluid to direct the pressurized fluid to the components in need of lubrication.

The transmission 10 is a dual clutch transmission having an input clutch arrangement 18 operable to selectively direct input torque to an odd input shaft 20 (also referred to herein as a first input shaft) or to an even input shaft 22 (also referred to herein as a second input shaft) concentric with the odd input shaft 20 in alternating fashion with subsequent speed ratio changes. Other types of transmissions may also be used within the scope of the claimed invention. Torque is transferred from the odd input shaft 20 or the even input shaft 22 to either an upper layshaft 24 or a lower layshaft 26 through various sets of intermeshing gears depending on a synchronizer engagement schedule. Torque is transferred to a final drive ring gear 28. Axes of rotation of the input shafts 20, 22, the upper layshaft 24 and the lower layshaft 26 are indicated as axes 25, 27 and 29 in FIG. 1.

In a transmission relying on splash lubrication, such as transmission 10, the main source for splashed oil is the final drive ring gear 28 and the largest gears 30, 32 on the lower layshaft 26. The final drive ring gear 28 and gears 30, 32 are partially submerged in the unpressurized lube oil that drains by gravity to the bottom of the case 12. When rotating, the final drive ring gear 28 and gears 30, 32 throw the unpressurized fluid against the interior walls of the transmission case 12 and the clutch housing 14. The splashed fluid and mist created by the splashing adheres to the interior walls of the case 12 and clutch housing 14.

Figure 2:
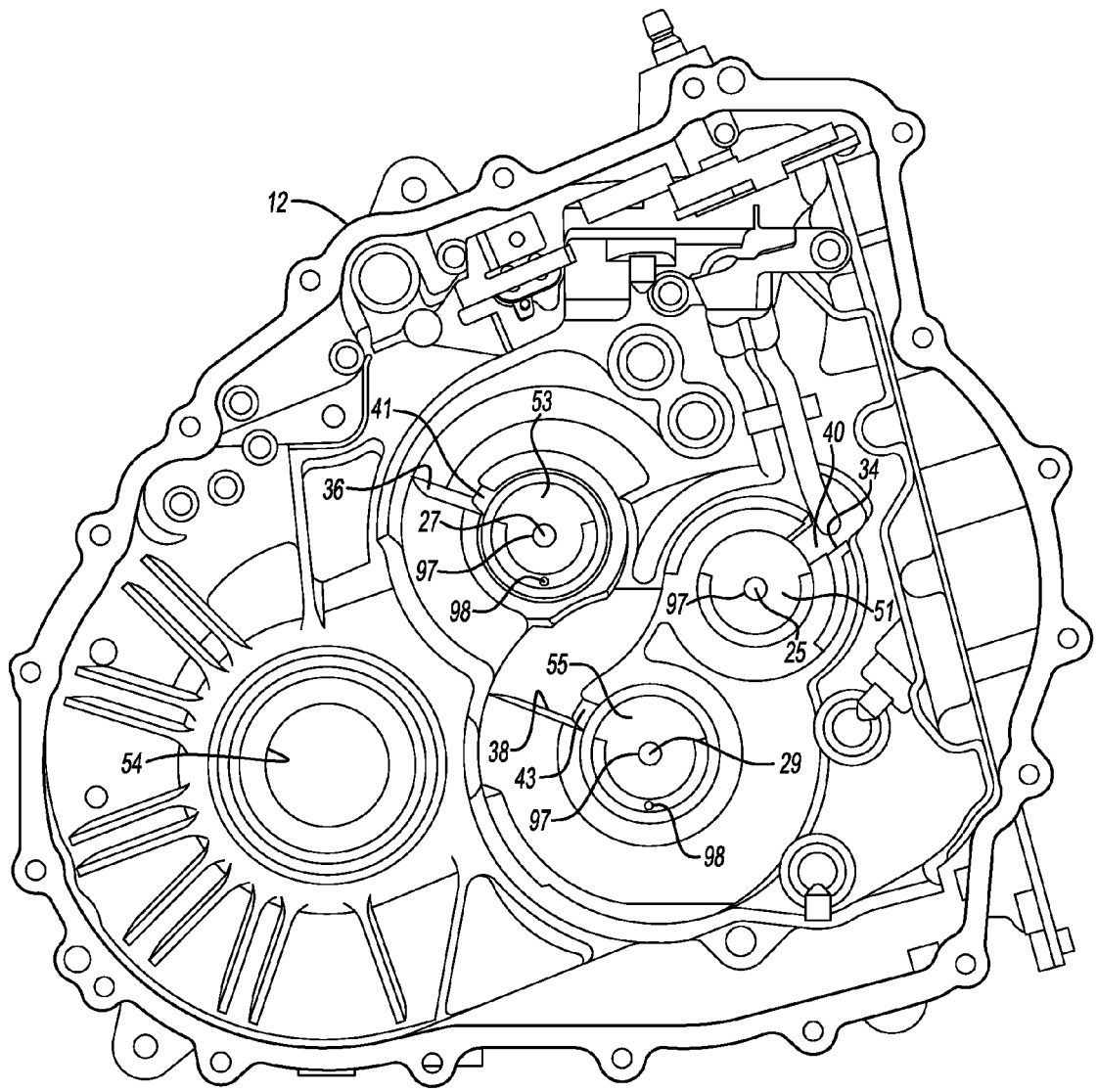
FIG. 2 is a schematic end view illustration of a portion of the transmission of FIG. 1 showing feeder caps connected to a transmission casing.

Referring to FIG. 2, the transmission case 12 is shown with first features referred to herein as catchers 34, 36 and 38 that are cast ribs or extensions in the case 12 that collect the splashed fluid and are positioned to direct the collected fluid to second features, referred to herein as slots 40, 41, 43 also cast in the case 12. The slots 40, 41, 43 are positioned at an angle to direct the collected oil to first chambers 42, 44, 46 formed by the transmission case 12 adjacent first ends 48, 50, 52 of the odd input shaft 20, the upper layshaft 24, and the lower layshaft 26, respectively, as shown in FIG. 1. In FIG. 2, the chambers 42, 44 and 46 are obscured by first feeder caps 51, 53, 55 connected to the case 12 to further define the chambers 42, 44 and 46, and discussed in more detail below. The slots 40, 41, 43 could be machined instead of cast. The corresponding axes of rotation 25, 27 and 29 are indicated in FIG. 2 to illustrate the alignment of the transmission case 12 with the various respective shafts of FIG. 1. An opening 54 for a final drive axle is also indicated in FIG. 2.

Figure 3:
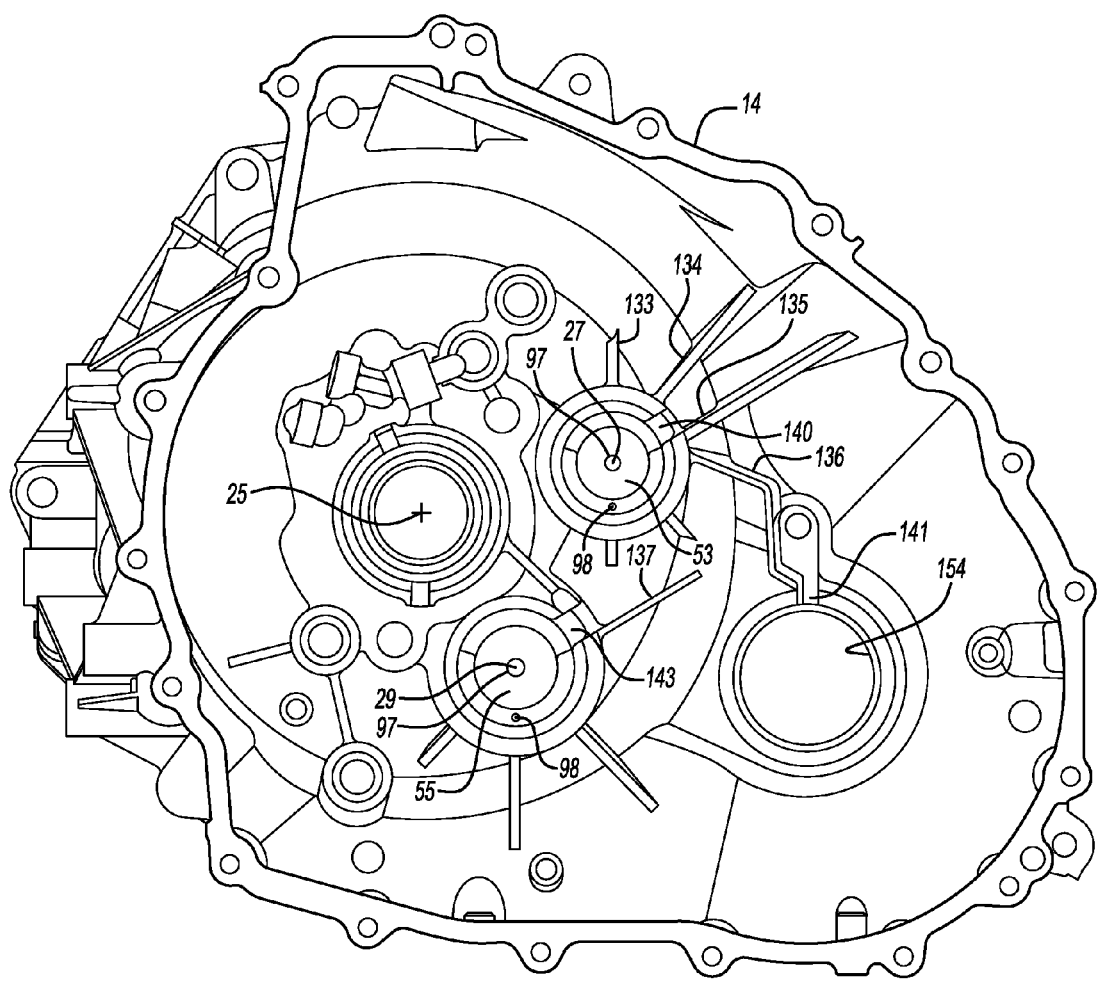
FIG. 3 is a schematic end view illustration of another portion of the transmission of FIG. 1 showing feeder caps connected to a clutch housing.

Referring to FIG. 3, the clutch housing 14 is shown with a variety of features similar to those of the transmission case 12. Specifically, the clutch housing 14 is shown with first features referred to herein as catchers 133, 134, 135, 136 and 137 that are cast ribs in the clutch housing 14 that collect the splashed fluid and are positioned to direct the collected fluid to second features, referred to herein as slots 140, 141, 143 also cast in the clutch housing 14. The catchers 133, 134 direct the fluid to the slot 140. The slots 140 and 143 are positioned at an angle to direct the collected oil to second chambers 142 and 144 formed by the clutch housing 14 adjacent second ends 148 and 152 of the upper layshaft 24 and the lower layshaft 26, respectively, as shown in FIG. 1. Slot 141 directs the oil collected by catcher 136 to a final drive bearing (not shown in FIG. 3). In FIG. 3, the chambers 142 and 144 of FIG. 1 are obscured by second feeder caps 53 and 55 connected to the clutch housing 14 to further define the chambers 142 and 144, and discussed in more detail below. The slots 140, 141, and 143 could be machined instead of cast. The corresponding axes of rotation 25, 27 and 29 are indicated in FIG. 3 to illustrate the alignment of the clutch housing 14 with the various respective shafts of FIG. 1. An opening 154 for a final drive axle is also indicated in FIG. 3.

Referring again to FIG. 1, the odd input shaft 20, the upper layshaft 24 and the lower layshaft 26 each have a respective axial passage 60, 62, 64 running therethrough which may be bored or otherwise machined. Axial passage 62 runs from first end 50 to second end 148 of upper layshaft 24. Radial passages 66, 68, 70 and 72 extend from the axial passage 62 into fluid communication with transmission components such as synchronizers 74, 75 and gears 76, 78, 80, and 81. Axial passage 64 runs from first end 52 to second end 152 of lower layshaft 26. Radial passages 82, 83, 84 and 85 extend from the axial passage 64 into fluid communication with other transmission components such as synchronizers 86, 88 and gears 30, 31, 32, and 33. Axial passage 60 extends from the first end 48 of the odd input shaft 20 along a majority of its length. A radial passage 90 extends in fluid communication with axial passage 60 to allow fluid to flow from axial passage 60 to needle bearings 92 nested in the crevice between odd input shaft 20 and even input shaft 22.

Tapered roller bearings 94 support upper layshaft 24 on the transmission side and are mounted between the upper layshaft 24 and the transmission housing 12 near the chamber 44 at first end 50 of upper layshaft 24. Like tapered roller bearings 94 are mounted between lower layshaft 26 and transmission housing 12 near the chamber 46 at first end 52 of lower layshaft 26. Similar tapered roller bearings 95 are mounted between upper layshaft 24 and clutch housing 14 and between lower layshaft 26 and clutch housing 14 near respective chambers 142, 144 at second ends 148, 152 of the upper and lower layshafts 24, 26.

Figure 5:
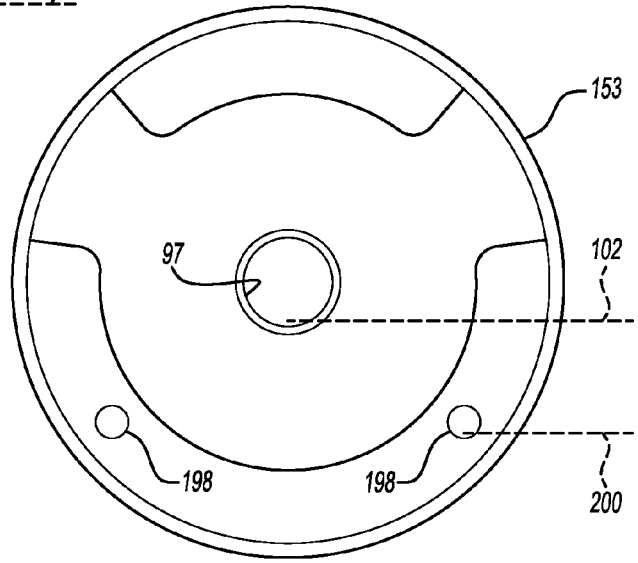
FIG. 5 is a schematic end view illustration of an alternative embodiment of a feeder cap for use in the transmission of FIG. 1.
Figure 6:
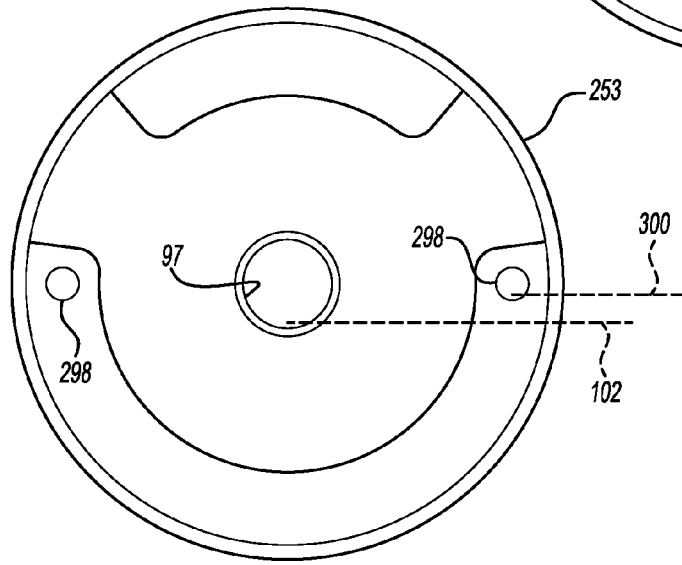
FIG. 6 is a schematic end view illustration of another alternative embodiment of a feeder cap for use in the transmission of FIG. 1.

Referring to FIG. 1, the unpressurized fluid is collected in the chambers 44, 46, 142 and 144. Feeder caps 53 and 55 are pressed into the transmission case 12 or clutch housing 14. Feeder caps 53 and 55 have orifices 98, shown in FIGS. 2-4 that are positioned and sized to control the amount of fluid that flows from the chambers 44, 46, 142, and 144 to lubricate the tapered bearings 94, as explained below. Other embodiments of feeder caps 153, 253 are shown in FIGS. 5 and 6.

Figure 7:
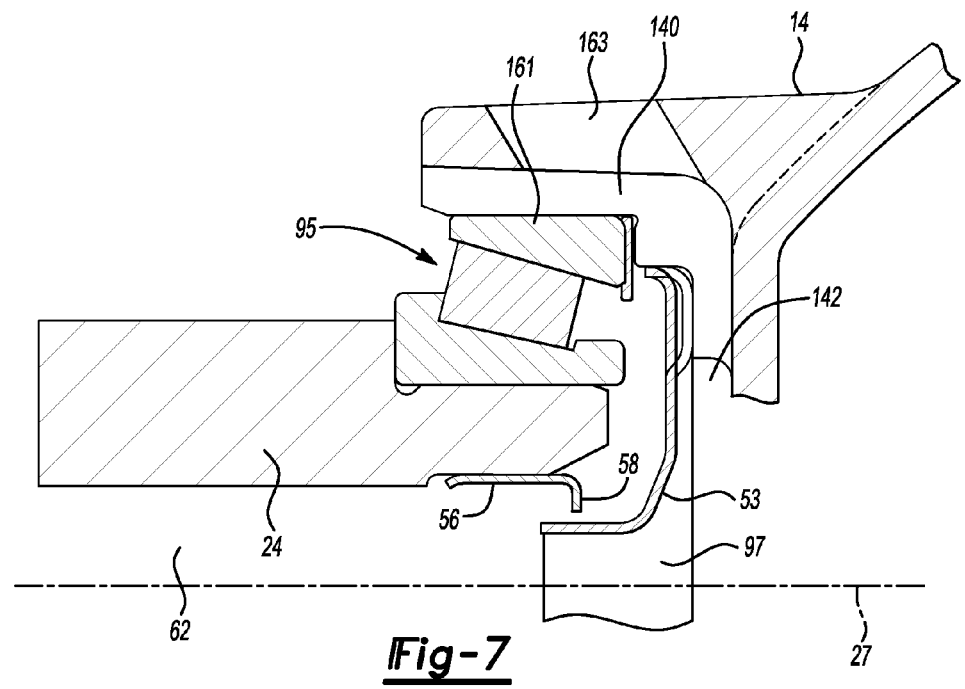
FIG. 7 is a schematic cross-sectional illustration of a portion of one of the feeder caps press-fit to the clutch housing and a plug press-fit to an upper layshaft, and showing a portion of a tapered roller bearing adjacent the feeder cap taken at the lines 7-7 in FIG. 8 (upper layshaft and portions of the tapered roller bearing not shown in FIG. 8)

In order to enable the prioritization of fluid flow from first chamber 44, a component referred to herein as a feeder cap 53 is secured to the transmission case 12 by press-fitting. Similar feeder cap 53 is press-fit to the clutch housing 14 to partially define chamber 142. Feeder caps 55 are press-fit to the transmission housing 12 and to the clutch housing 14 to further define chambers 46 and 144. Annular members referred to as a plugs 56 are press-fit to both ends of the upper layshaft 24 the axial passage 62. Similar plugs 56 are press-fit to both ends of the lower layshaft 26 at the axial passage 64. Referring to FIG. 7, the plug 56 press-fit to upper layshaft 24 is shown adjacent the feeder cap 53 press-fit to the clutch housing 14, and is representative of all of the plugs 56. The plug 56 has a flange that extends radially-inward and is referred to as a dam member 58. The dam member 58 is radially-outward of a neck portion of the feeder cap 53. The slot 140 formed by the clutch housing 14 is just above the outer race 161 of the tapered roller bearing 95. A bore 163 extends through the clutch housing 14 into fluid communication with the slot 140 which leads to the chamber 142.

Figure 8:
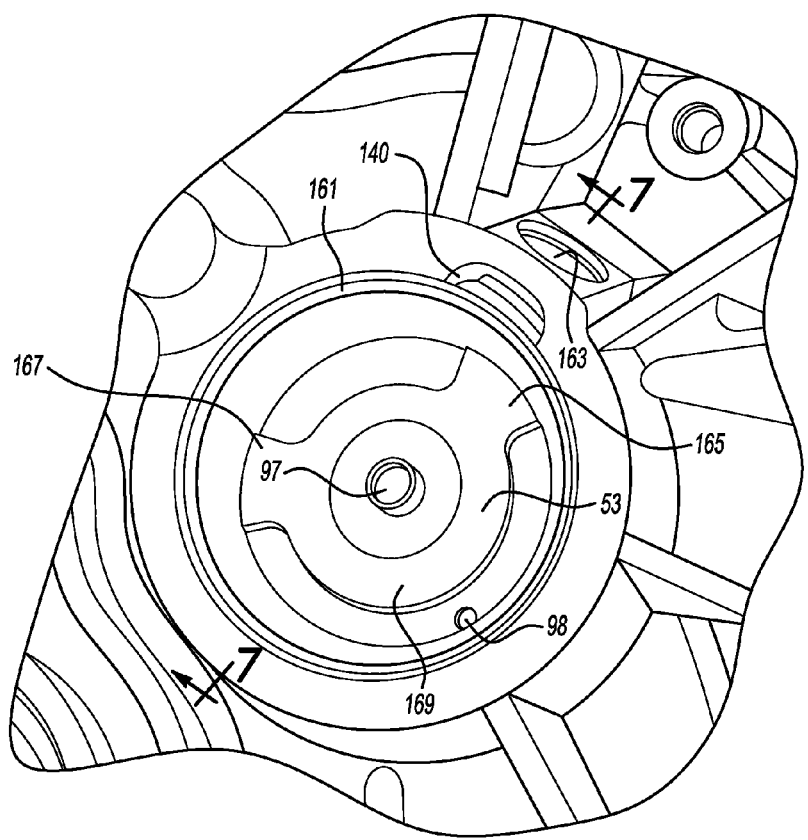
FIG. 8 is a schematic perspective illustration of the feeder cap of FIG. 7 press-fit to the clutch housing of FIG. 1.

Referring to FIG. 8, the only way a substantial amount of oil in the chamber 142 of FIG. 7 can reach the moving portions of the tapered roller bearing 95 of FIG. 7 is through the orifice 98. Other clearance gaps between the feeder cap 53 and the tapered roller bearing 85 necessary for assembly of the transmission do not allow any substantial lubrication flow. Calibration of the amount of lubrication flow to the tapered roller bearing 95 is easily determined by the size and position of the orifice 98, and is discussed further below with respect to FIG. 4 to FIG. 6. As shown in FIG. 8, the feeder cap 53 has two formations 165 and 167. The formation 165 aligns with the slot 140 and helps define the chamber 142 of FIG. 7. The formation 167 is present because the feeder cap 53 is also designed to be installed to other shafts in other transmissions in which the orientation of formation 167 aligns with a slot similar to slot 140, so that formation 167 is utilized instead of formation 165. A central formation 169 also helps define the chamber 142. Similar formations are shown on the feeder caps of FIGS. 4-6 but are not numbered.

Referring again to FIG. 7, flow to the axial passage 62 in the upper layshaft 24 and to rotating components such as the synchronizers 74, 75 and gears 76, 78, 80, and 81 is through the central opening 97 in the feeder cap 53. Flow through the opening 97 is thrown by centrifugal force radially-outward against the inner surface of the upper layshaft 24 at the axial passage 62. The dam member 58 prevents any backflow of the fluid from reaching the tapered roller bearing 95 as long as the amount of fluid coating the upper layshaft 24 at the axial passage 62 forms a layer thinner than the radial extension of the dam member 58. Thus, the dam member 58 further ensures that the amount of fluid to the tapered roller bearing 95 is determined by the size and position of the orifice 98 of FIG. 8.

Figure 4:
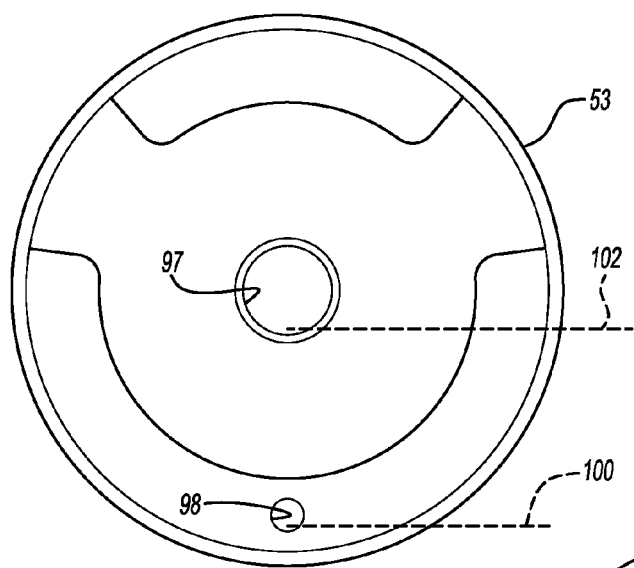
FIG. 4 is a schematic end view illustration of one of the feeder caps of FIGS. 2 and 3.

As best shown in FIG. 4, the feeder cap 53 press-fit to the transmission case 12 at the left end of the upper layshaft 24 of FIG. 1 is shown. The feeder cap 53 has a central opening 97 that aligns with the axial passage 62 of FIG. 1. The feeder cap 53 also has an orifice 98 that is radially-offset from the central opening 97. In FIG. 4, the orifice 98 is positioned at the lowest angular position on the feeder cap 53 (i.e., in a "six-o-clock position") and has a smaller diameter than the central opening 97. Note that the feeder cap 53 of FIG. 8 shows an alternate angular position of the orifice 98. Fluid will begin flowing through the orifice 98 of FIG. 4 to the tapered roller bearing 94 of FIG. 1 when fluid reaches a first level in the chamber 42 indicated by level 100 in FIG. 4 (i.e., just above the bottom of the orifice 98). Fluid will not begin flowing to the transmission components through the central opening 97 until fluid reaches a second level in the chamber 42 indicated by level 102 of FIG. 5 (i.e., just above the bottom of central opening 97).

Thus, because level 100 is lower than level 200 (assuming the transmission 10 is shown in a representative orientation as when installed), the tapered roller bearing 94 (referred to herein as a first transmission component) will be lubricated prior to the transmission components lubricated through axial passage 62 and radial passages 66, 68, 70 and 72, such as synchronizers 74, 75 and gears 76, 78, 80, and 81, referred to herein as second transmission components. Additionally, the diameter of the orifice 98 is selected to limit the amount of flow emptying the chamber 42 through the orifice 98 so that the tapered roller bearing 94 receives an adequate amount of lubrication without unnecessarily utilizing lubrication better directed toward synchronizers 74, 75, and gears 76, 78, 80, and 81.

An additional first feeder cap 55 is similarly press-fit to the transmission casing 12 and is in alignment with a plug 56 press-fit to the lower layshaft 26 to further define respective first chamber 46. Feeder cap 55 causes lubrication to tapered roller bearing 94 at first end 52 of lower layshaft 26 to be prioritized via flow through the orifice 98 to the tapered roller bearing 94 and through the central passage 97 to the axial passage 64 and radial passages 82, 83, 84 and 85 to synchronizers 86, 88, and gears 28, 30, 31, 32, and 33.

Similar feeder caps 53, 55 are press-fit to the clutch housing 14. Plugs 56 are press-fit to the second ends 148, 152 of the upper layshaft 24 and the lower layshaft 26 to further define respective chambers 142, 144. In this way, lubrication flow is prioritized between tapered roller bearings 95, referred to herein as third transmission components, and the transmission components in fluid communication with the respective axial passages 62, 64, i.e., synchronizers 74, 75 and gears 76, 78, 80, and 81, as well as synchronizers 86, 88 and gears 28, 30, 31, 32, and 33 referred to herein as fourth transmission components.

Fluid is thus distributed to components through the axial passages 62, 64 from both ends of the passages. The tapered roller bearing 95 near end 148 of the upper layshaft 24 may be referred to as a third transmission component, while the synchronizer 75 may be referred to as a fourth transmission component. Synchronizer 75 is more readily lubricated by flow from the second chamber 142 than from the first chamber 44 as it is closer to the chamber 142. Fluid distribution from both ends of the upper layshaft 24 more evenly distributes lubrication through the radial passages 66, 68, 70 and 72 than if fluid flowed only from one end of the upper layshaft 24. Because fluid is also distributed from both ends of lower layshaft 26, fluid is more evenly distributed to the synchronizers 86, 88, and gears 28, 30, 31, 32, and 33 than if fluid flow was from only one end of the axial passage 64. The tapered roller bearing 95 near end 152 of the lower layshaft 26 may be referred to as a third transmission component, while synchronizer 88 closest to the second end 152 may be referred to as a fourth transmission component. Synchronizer 88 is more readily lubricated by flow from the second chamber 144 than from the first chamber 46 as it is closer to second chamber 144. The position of the orifices 98 may be the same or different on the feeder caps 53, 55 connected at second ends 148, 152, so that the level 100 may be a third predetermined level and the level 102 may be a fourth predetermined level which may be the same or different than the first and second levels in chambers 42, 46, respectively.

Referring to FIGS. 5 and 6, alternate embodiments of feeder caps 153, 253 are shown with orifices 198, 298 positioned differently than orifice 98 of FIG. 4. Orifices 198 of FIG. 2 are positioned higher than orifice 98 would be in any of the chambers, such as chamber 44, so that fluid does not flow to tapered roller bearings 94 until fluid level in the chamber reaches level 200 (i.e., a level just above the lowest point of the orifices 198). In FIG. 6, orifices 298 are positioned even higher, with the lowest portion of the orifice opening higher than the lowest portion of the central opening 97. In this embodiment, fluid reaches the second predetermined level 102 to flow through the central opening 97 prior to reaching first predetermined level 300, a level just above the bottom of orifices 298. Fluid will thus flow to transmission components in communication with the axial passage of the shaft to which the feeder cap 253 is connected, for example the synchronizers 74, 75 in fluid communication with the axial passage 60 of the upper layshaft 24, prior to flowing to transmission components in fluid communication with the orifices 298, such as tapered roller bearing 94. Thus, by selecting both the diameter and the position of the orifices 98, 198, 298 on the feeder cap, 53, 153, 253, lubrication is prioritized between transmission components near chambers at ends of rotating shafts versus those spaced from the chambers and in communication through some portion of an axial passage through the rotating shafts.

Referring again to FIG. 1, unlike upper and lower layshafts 24, 26, the axial passage 60 in odd input shaft 20 has a diameter too small to enable a plug 56 to be press-fit, as the presence of a plug would then require that the central opening 97 in the feeder cap 51 be very small and too restrictive to enable adequate flow. Because no plug 56 is press-fit to odd input shaft 20, a threaded inner bore 93 of the odd input shaft 20 near the end of axial passage 60 is used to prevent back flow of fluid from the axial passage 60 to the roller bearings 91. The threaded bore 93 creates a pumping action as the odd input shaft rotates, driving the lubricating fluid axially inward through the passage 60 to radial passages 90 to lubricate needle bearings 92. The threaded bore 93 may be of relatively large pitch, or may be a standard pitch, but with an increasing minor diameter in order to have the capability of displacing the oil axially in the axial passage 60 in a relatively quick manner and to maintain radial clearance between feeder cap 51 and first input shaft 20.

The roller bearings 91 are lubricated with packed grease, and do not require lubrication from the transmission fluid. Thus, feeder cap 51 as shown in FIG. 2 has no orifice similar to orifices 98 of feeder caps 53 and 55. Flow enters axial passage 60 of the first input shaft 20 from one end only (first end 50).

Accordingly, the splash lubrication system of the transmission 10 utilizes feeder caps 53 and 55, and plugs 56 with dam members 58, to control the amount of lubrication to tapered roller bearings 94, 95 and prevent backflow to the bearings 94, 95 from the axial passages 62, 64, with rotating components fed through axial passages 62, 64 from both ends of the layshafts 24, 26. A feeder cap 51 is used on one end of the axial passage 60 of the odd input shaft 20, and threaded axial bore 93 of odd input shaft 20 discourages backflow to the roller bearing 91.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   a transmission case at least partially defining a cavity containing unpressurized fluid;
   wherein the transmission case is formed with a first feature configured to collect the fluid when the fluid is splashed and a second feature configured to direct the collected fluid to a chamber at least partially formed by the transmission case;
   a cap connected to the transmission case to further define the chamber; wherein the cap has an opening and an orifice offset from the opening; wherein fluid flows from the chamber through the orifice when fluid reaches a first level in the chamber and flows through the opening when fluid reaches a second level in the chamber different than the first level, thereby prioritizing lubrication of components of the transmission.

2. The transmission of claim 1, further comprising:
   a shaft positioned within the case having an axial passage extending from a first end of the shaft at least partially along the shaft, and a radial passage extending from the axial passage to the cavity;
   a first transmission component in fluid communication with the chamber through the orifice;
   a second transmission component in fluid communication with the chamber through the opening, the axial passage and the radial passage;
   lubrication of the first transmission component relative to the second transmission component thereby determined by fluid flowing from the chamber and by the position and size of the orifice.

3. The transmission of claim 2, further comprising a second shaft with a second axial passage; wherein the second shaft is internally threaded along at least a portion of the second axial passage near an end of the second shaft to promote flow away from the end of the second shaft through the second axial passage.

4. The transmission of claim 2, further comprising an annular plug press fit to the shaft in the axial passage at the first end and having a flange extending radially inward to create a dam preventing flow from the axial passage back toward the first end.

5. The transmission of claim 1, wherein the cap has multiple formations that further define the chamber and only one of which radially aligns with the second feature.

6. A transmission comprising:
   a transmission case at least partially defining a cavity containing unpressurized fluid;
   a clutch housing further defining the cavity;
   a plurality of rotatable components positioned within the cavity and operable to throw the unpressurized fluid against the transmission case and the clutch housing when rotating;
   a shaft positioned within the case and having an axial passage extending from a first end of the shaft to a second end of the shaft, and having radial passages in fluid communication with the axial passage and with the cavity; wherein the transmission case at least partially defines a first chamber at the first end of the shaft and the clutch housing at least partially defines a second chamber at the second end of the shaft; wherein the transmission case and the clutch housing are configured to collect the thrown fluid and direct the collected fluid to the first chamber and the second chamber, respectively; wherein the transmission case is formed with a catcher configured to collect the fluid when the fluid is splashed and a slot configured to direct the collected fluid to the first chamber;
   a plurality of transmission components in fluid communication with the cavity through the axial passage and the radial passages;
   a first cap connected to the transmission case between the first chamber and the first end of the axial shaft; wherein the first cap has an opening aligned with the axial passage and an orifice offset from the opening; wherein fluid flows through the orifice when fluid reaches a first level in the first chamber and flows through the opening when fluid reaches a second level in the chamber different than the first level; wherein the first cap has multiple formations that further define the first chamber and only one of which radially aligns with the slot; and
   wherein fluid is provided through the axial passage from both ends of the shaft to the plurality of rotatable components.

7. The transmission of claim 6, further comprising:
   a second cap connected to the transmission case between the second chamber and the second end of the axial shaft; wherein the second cap has an additional opening aligned with the axial passage and an additional orifice radially offset from the additional opening; wherein fluid flows through the additional orifice when fluid reaches a third level in the second chamber and flows through the additional opening when fluid reaches a fourth level in the second chamber different than the third level.

8. The transmission of claim 6, further comprising an annular plug press fit to the shaft in the axial passage at the first end and having a flange extending radially inward to create a dam preventing flow from the axial passage back toward the first end.

9. The transmission of claim 6, further comprising a second shaft with a second axial passage; wherein the second shaft is internally threaded along at least a portion of the second axial passage near an end of the second shaft to promote flow away from the end through the second axial passage.

10. A transmission comprising:
    a transmission case at least partially defining a cavity containing unpressurized fluid;
    a rotatable component positioned within the cavity and operable to throw the unpressurized fluid against the transmission case when rotating;
    a shaft positioned within the case and having an axial passage extending from a first end of the shaft to a second end of the shaft;
    wherein the transmission case is formed with a catcher configured to catch at least some of the thrown fluid and a slot configured to direct the caught fluid to a chamber at least partially formed by the transmission case and aligned with the first end of the axial shaft;
    a cap connected to the transmission case and further defining the chamber between the transmission case and the first end of the axial shaft; wherein the cap has an opening aligned with the axial passage and an orifice offset from the opening; wherein fluid flows from the chamber through the orifice when fluid reaches a first level in the chamber and flows from the chamber through the opening when fluid reaches a second level in the chamber different than the first level;

a first transmission component in fluid communication with the chamber through the orifice; and a second transmission component in fluid communication with the chamber through the opening and the axial passage;

lubrication of the first transmission component relative to the second transmission component thereby determined by fluid flowing from the chamber and by the position and size of the orifice.

11. The transmission of claim 10, wherein the first transmission component is a tapered roller bearing.

12. The transmission of claim 10, wherein the shaft has a radial passage in fluid communication with the axial passage; and wherein the second transmission component is in fluid communication with the axial passage through the radial passage.

13. The transmission of claim 10, further comprising a second shaft with a second axial passage; wherein the second shaft is internally threaded along at least a portion of the second axial passage near an end of the second shaft to promote flow away from the end of the second shaft through the second axial passage.

14. The transmission of claim 10, further comprising:

a clutch housing further defining the cavity; wherein the clutch housing has an additional first feature configured to catch at least some of the thrown fluid and an additional second feature configured to direct the thrown fluid to an additional chamber at least partially formed by the clutch housing and aligned with the second end of the axial shaft;

another cap connected to the clutch housing and further defining the additional chamber between the clutch housing and the second end of the axial shaft; wherein the another cap has an additional opening aligned with the axial passage and an additional orifice offset from the additional opening; wherein fluid flows through the additional orifice when fluid reaches a third level in the additional chamber and flows through the additional opening when fluid reaches a fourth level higher in the additional chamber different than the third level;

a third transmission component in fluid communication with the additional chamber through the additional orifice;

a fourth transmission component in fluid communication with the additional chamber through the additional opening and the axial passage;

lubrication of the third transmission component relative to the fourth transmission component thereby determined by fluid flowing from the additional chamber and by the position and size of the additional orifice.

15. The transmission of claim 10, wherein the cap has multiple formations that further define the chamber and only one of which radially aligns with the slot.

* * * * *